US012804049B2

(12) United States Patent
Qian et al.

(10) Patent No.: US 12,804,049 B2
(45) Date of Patent: Nov. 17, 2026

(54) SERVICE MANAGEMENT SYSTEM AND SERVICE MANAGEMENT METHOD

(71) Applicant: Shanghai Gewu Zhiyuan Network Technology Co., Ltd., Shanghai (CN)

(72) Inventors: Zhenxing Qian, Beijing (CN); Yimin Li, Beijing (CN); Xuebo Hong, Beijing (CN); Lixin Guan, Beijing (CN); Dong Chen, Beijing (CN)

(73) Assignee: SHANGHAI GEWU ZHIYUAN NETWORK TECHNOLOGY CO., LTD., Beijing (CN)

( * ) Notice: Subject to any disclaimer, the term of this patent is extended or adjusted under 35 U.S.C. 154(b) by 105 days.

(21) Appl. No.: 18/807,680

(22) Filed: Aug. 16, 2024

(65) Prior Publication Data

US 2025/0063098 A1 Feb. 20, 2025

(30) Foreign Application Priority Data

Aug. 17, 2023 (CN) ........................ 202311042975.6

(51) Int. Cl.
*H04L 67/51* (2022.01)
*H04L 67/00* (2022.01)

(52) U.S. Cl.
CPC .............. *H04L 67/51* (2022.05); *H04L 67/34* (2013.01)

(58) Field of Classification Search
CPC ....... H04L 67/51; H04L 67/34; H04L 69/321; H04L 67/63; H04L 67/12; G06Q 10/103; G06Q 30/0601
See application file for complete search history.

(56) References Cited

U.S. PATENT DOCUMENTS

2003/0058277 A1* 3/2003 Bowman-Amuah ........................ G06F 16/289 715/765
2011/0107391 A1* 5/2011 Brown .................... H04L 47/20 726/1

(Continued)

FOREIGN PATENT DOCUMENTS

CN 102662884 A 9/2012
CN 106341432 A 1/2017

(Continued)

OTHER PUBLICATIONS

International Search Report and Written Opinion for International Application No. PCT/CN2024/112888, mailed on Nov. 1, 2024, 16 pages.

*Primary Examiner* — Christopher B Robinson
*Assistant Examiner* — Tania M Pena-Santana
(74) *Attorney, Agent, or Firm* — Astute IP Law Group

(57) ABSTRACT

Embodiments of the disclosure discloses a service management system, a service management method, a device and a storage medium. The system includes a server, a plurality of devices, and a plurality of clients establishing a communication connection with the plurality of devices; the server is configured to receive a service execution request, determine a target client from the plurality of clients based on an identifier of a target client comprised in the service execution request, and forward the service execution request to the target client; and the target client is configured to parse service information comprised in the service execution request, determine a target device corresponding to the service information from the plurality of devices, generate a driving instruction for the target device by invoking a target (Continued)

device driving service of the target device, and drive the target device with the driving instruction to respond to the service information.

20 Claims, 6 Drawing Sheets

(56) References Cited

U.S. PATENT DOCUMENTS

| | | | | |
|---|---|---|---|---|
| 2012/0246213 | A1* | 9/2012 | Ma | H04L 67/561 709/201 |
| 2015/0088971 | A1 | 3/2015 | Janardanan et al. | |
| 2018/0205721 | A1* | 7/2018 | Hirahara | H04L 9/3242 |
| 2021/0350401 | A1* | 11/2021 | Weng | G06Q 30/0201 |

FOREIGN PATENT DOCUMENTS

| | | | |
|---|---|---|---|
| CN | 113157382 | A | 7/2021 |
| CN | 114079743 | A | 2/2022 |
| CN | 114240574 | A | 3/2022 |
| CN | 116090997 | A | 5/2023 |

* cited by examiner

SERVICE MANAGEMENT SYSTEM AND SERVICE MANAGEMENT METHOD

CROSS-REFERENCE

This application claims priority to Chinese Patent Application No. 202311042975.6, filed on Aug. 17, 2023 and entitled "SERVICE MANAGEMENT SYSTEM, SERVICE MANAGEMENT METHOD, DEVICE AND STORAGE MEDIUM", the entire content of which is incorporated herein by reference.

FIELD

Embodiments of the present disclosure relate to the field of computer technologies, and in particular, to a service management system, a service management method, a device, and a storage medium.

BACKGROUND

For an e-commerce platform, a plurality of e-commerce warehouses for providing commodity delivery are often correspondingly set up, and the e-commerce platform may deliver service requirements (for example, order services to be delivered) to the e-commerce warehouse through a service server (such as a service server running a warehouse management system) and related data management of products stored in the e-commerce warehouse.

In practical applications, the response of the e-commerce warehouse to the delivered service requirement requires the support of software and hardware configured in the e-commerce warehouse. For example, the printer in the e-commerce warehouse participates in printing the to-be-delivery order, and the sorting device in the e-commerce warehouse is required to participate in sorting of the to-be-delivery commodity.

In the current architecture mode of directly accessing a service server for service interaction in a webpage form in an e-commerce warehouse, due to complex and diverse software and hardware environments for the e-commerce warehouses, the software and hardware environments of different e-commerce warehouses have significant differences. Thus, the interaction stability between a service server and an e-commerce warehouse cannot be ensured, and the hardware (such as a printer and a sorting device) in the e-commerce warehouse cannot be ensured to give an effective response to a service request from the service server.

SUMMARY

Embodiments of the present disclosure provide a service management system and a computer device, to facilitate management of effective execution of a service request corresponding to a service requirement on a device of a service executor.

In a first aspect, an embodiment of the present disclosure provides a service management system, including: a server, a plurality of devices, and a plurality of clients establishing a communication connection with the plurality of devices;

- the server is configured to receive a service execution request, determine a target client from the plurality of clients based on an identifier of a target client comprised in the service execution request, and forward the service execution request to the target client; and

- the target client is configured to parse service information comprised in the service execution request, determine a target device corresponding to the service information from the plurality of devices, generate a driving instruction for the target device by invoking a target device driving service of the target device, and drive the target device with the driving instruction to respond to the service information,
- wherein the target client is pre-configured with device driving services corresponding to the plurality of devices.

According to a second aspect, an embodiment of the present disclosure further provides a service management method performed by the service management system according to the first aspect, comprising:

- receiving a service execution request by a server, determining a target client from the plurality of clients based on an identifier of a target client comprised in the service execution request, and forwarding the service execution request to the target client; and
- parsing, by a target client, service information comprised in the service execution request, determining, from the plurality of devices, a target device corresponding to the service information, generating a driving instruction for the target device by invoking a target device driving service of the target device, and driving the target device with the driving instruction to respond to the service information,
- wherein the target client is pre-configured with device driving services corresponding to the plurality of devices.

According to a third aspect, an embodiment of the present disclosure further provides a computer device, including:

- one or more processors;
- a storage device configured to store one or more programs, and
- a server or a client in the service management system according to the first aspect of the embodiment.

According to a fourth aspect, an embodiment of the present disclosure further provides a storage medium including computer-executable instructions, where the computer-executable instructions, when executed by a computer processor, are configured to perform the service management method according to the second aspect of the embodiments.

The technical scheme of the embodiment of the invention specifically discloses a service management system, a service management method and device and a storage medium. The service management system comprises a server, a plurality of devices, and a plurality of clients establishing a communication connection with the plurality of devices; the server is configured to receive a service execution request, determine a target client from the plurality of clients based on an identifier of a target client comprised in the service execution request, and forward the service execution request to the target client; and the target client is configured to parse service information comprised in the service execution request, determine a target device corresponding to the service information from the plurality of devices, generate a driving instruction for the target device by invoking a target device driving service of the target device, and drive the target device with the driving instruction to respond to the service information, wherein the target client is pre-configured with device driving services corresponding to the plurality of devices. In the foregoing technical solution of this embodiment, an assistance system is provided for supporting service interaction, which is different from an existing service execution logic that directly accesses a service server through a webpage link to obtain a service requirement, and then uses another manner to control a device involved in a service requirement to execute the service logic. This technical solution enables the transmission of a service execution request from the server within the provided system to the target client. Subsequently, the target client identifies the target device associated with the service execution request and directly drives the target device to respond to the service execution logic of the service execution request. According to the service interaction process, the effective response of the equipment of the service execution party to the service execution request is realized; meanwhile, the service execution request is forwarded to the target client through the server, the decoupling of the service server end for generating the service execution request and the service execution side is realized, so that the service server does not need to pay attention to the difference of different devices in the software and hardware environments. Different devices can be directly adapted through the service management system provided by the embodiment, the interaction stability between the service server and the equipment is better improved, and the effective response of the equipment to the service request related to the service server is also ensured.

BRIEF DESCRIPTION OF DRAWINGS

In order to more clearly illustrate the technical solutions of the exemplary embodiments of the present disclosure, the following briefly describes the accompanying drawings required to describe the embodiments. Apparently, the drawings introduced are only the drawings of a part of the embodiments to be described in the present disclosure, and not all drawings, and for those skilled in the art, other drawings may be obtained according to these drawings without creative work.

DETAILED DESCRIPTION

Figure 1:
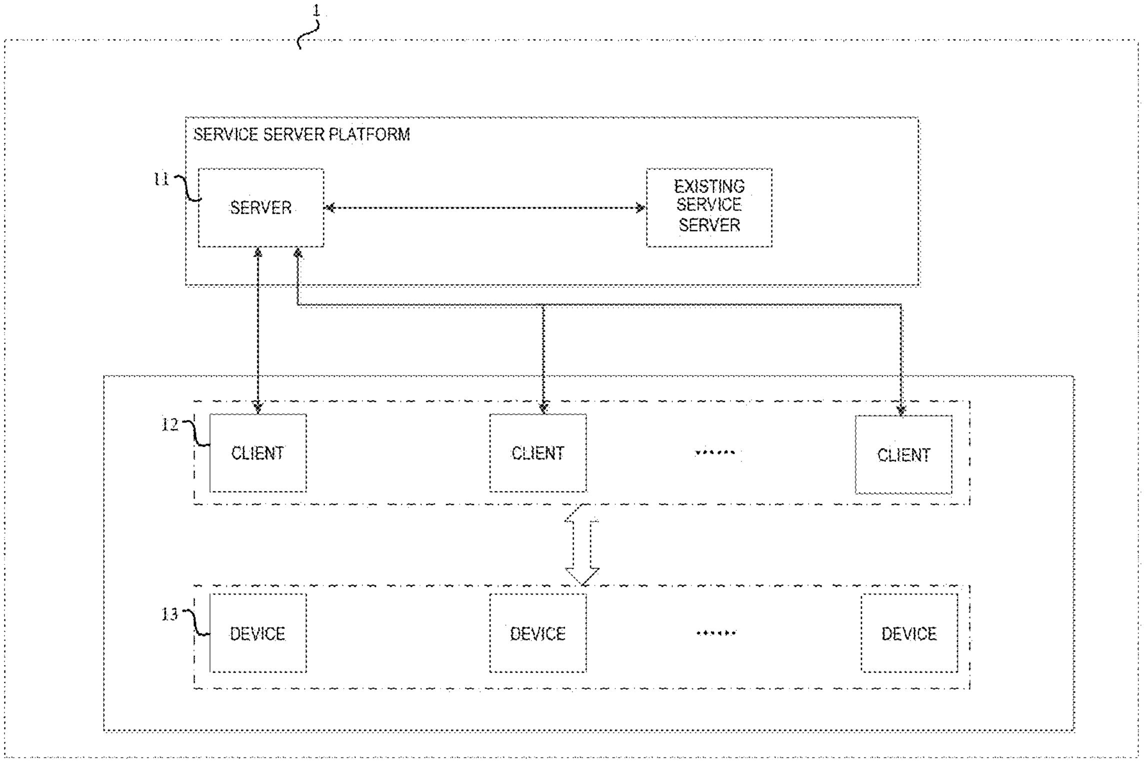
FIG. 1 is a system architecture diagram of a service management system according to an embodiment of the present disclosure.

Embodiments of the present disclosure will be described in more detail below with reference to the accompanying drawings. While certain embodiments of the present disclosure are shown in the drawings, it is to be understood that the present disclosure may be implemented in various forms, and should not be construed as limited to the embodiments set forth herein, and vice versa. It should be understood that the drawings and embodiments of the present disclosure are for exemplary purposes only and are not intended to limit the scope of the present disclosure.

It should be understood that the steps recited in the method embodiments of the present disclosure may be performed in different orders, and/or in parallel. Further, the method embodiments may include additional steps and/or omit performing the illustrated steps. The scope of the present disclosure is not limited in this respect.

As used herein, the term "comprising" and deformation thereof are open-ended, i.e., "including but not limited to". The term "based on" is "based at least in part on". The term "one embodiment" means "at least one embodiment"; the term "another embodiment" means "at least one further embodiment"; the term "some embodiments" means "at least some embodiments". The relevant definition of other terms will be given below.

It should be noted that concept concepts such as "first" and "second" mentioned in this disclosure are merely used to distinguish different apparatuses, modules, or units, and are not intended to limit the order of functions performed by the apparatuses, modules, or units or the mutual dependency relationship. It should be noted that the modification of "a" and "a plurality" mentioned in this disclosure is illustrative and not limiting, and those skilled in the art should understand that "one or more" should be understood unless the context clearly indicates otherwise.

The names of messages or information interaction between multiple devices in embodiments of the present disclosure are for illustrative purposes only and are not intended to limit the scope of such messages or information.

The names of messages or information interaction between multiple devices in embodiments of the present disclosure are for illustrative purposes only and are not intended to limit the scope of such messages or information.

It can be understood that, before the technical solutions disclosed in the embodiments of the present disclosure are used, the types of personal information related to the present disclosure, the usage scope, the usage scenario and the like should be notified to the user in an appropriate manner according to the relevant laws and regulations and obtain the authorization of the user.

For example, in response to receiving an active request from a user, prompt information is sent to the user to explicitly prompt the user that the requested operation will need to acquire and use the personal information of the user. Therefore, the user can autonomously select whether to provide personal information to software or hardware executing the operation of the technical solution of the present disclosure according to the prompt information.

As an optional but non-limiting implementation, in response to receiving the active request of the user, the manner of sending the prompt information to the user may be, for example, a pop-up window, and the prompt information may be presented in a text manner in the pop-up window. In addition, the pop-up window may further carry a selection control for the user to select "agree" or "not agree" to provide personal information to the terminal device.

It may be understood that the foregoing notification and obtaining a user authorization process is merely illustrative, and does not constitute a limitation on implementations of the present disclosure, and other manners of meeting related laws and regulations may also be applied to implementations of the present disclosure.

It should be understood that an application scenario involved in this embodiment may be described as that there is a service interaction between the e-commerce platform and the e-commerce warehouse, where a plurality of devices may exist in the e-commerce warehouse. In an actual application, an interaction association may be established between the e-commerce platform and the service server that is on the e-commerce platform and that is used to generate the service execution request in a form of webpage access, the service execution request sent by the service server is directly received, and then the corresponding service execution logic is executed by the device associated with the service execution request in other manners. In this interaction mode, due to a large difference between software and hardware environments in different e-commerce warehouses, there are also differences between a plurality of devices included in the e-commerce warehouse control device. Thus, the process of responding to the service execution request by the e-commerce warehouse control device is too tedious, and the effective response of the e-commerce warehouse side to the service execution request cannot be ensured, thereby affecting the stability of service interaction between the service server and the e-commerce warehouse.

However, this embodiment provides a service management system, which may be considered as an assistance system when a service interaction is performed between an e-commerce warehouse (a placement side of a plurality of devices) and a service server (an e-commerce platform side, that is, a backend that generates a service execution request). With participation of the service management system, service interaction between the e-commerce warehouse and the service server can be more flexible and effectively implemented.

FIG. 1 is a system architecture diagram of a service management system according to an embodiment of the present disclosure. As shown in FIG. 1 the service management system may include a server 11, a plurality of devices 13, and a plurality of clients 12 establishing communication connections with the plurality of devices.

The server 11 is configured to receive a service execution request, determine a target client from the plurality of clients 12 based on an identifier of a target client included in the service execution request, and forward the service execution request to the target client.

The target client is configured to parse service information included in the service execution request, determine a target device corresponding to the service information from the plurality of devices 13, generate a driving instruction for the target device by invoking a target device driving service of the target device, and drive the target device with the driving instruction to respond to the service information.

The target client is pre-configured with the device driving services corresponding to the plurality of devices 13.

In this embodiment, the service management system 1 provided specifically includes a server 11 and a client 12, where the server 11 may be considered as a background server, which may be installed on a given service serving platform, and the service serving platform may be used as a service platform dependency which the service demander implements service operation, and the service platform is further integrated with a service server 11 required by the service demander to generate an actual service execution request.

Based on the above description, taking the e-commerce used for online shopping as an example, the service serving platform on which the e-commerce service serving platform depends may be an e-commerce service serving platform, and the e-commerce service serving platform may be configured with a service server 11 that supports the online shopping service to operate normally. Different service servers 11 may support the service demander to propose different service requirements, and may generate a service execution request matching the service requirement, so that the service demand executor responds to the service execution request to implement service interaction. Taking an e-commerce warehouse as one of the service demand execution parties as an example, a system in which business interaction exists between the e-commerce warehouse and the e-commerce warehouse may have a warehouse management system. Through the warehouse management system, related business interaction such as transaction order acquisition and printing, commodity sorting and the like can be established between the network shopping e-commerce and the e-commerce warehouse.

It should be known that there may be a plurality of service demand executors in service interaction with the service demander, and different service demand executors may be set in different geographical ranges, for example, the e-commerce warehouse may be set up in different administrative regions. In this embodiment, the plurality of devices 13 and the plurality of clients 12 included in the system may be located in a physical space where the service demand executor is actually located, and a plurality of devices 13 and a plurality of clients 12 may be located in the physical spaces where different service demand executors are actually located.

In this embodiment, the plurality of devices 13 may be considered as actual execution devices 13 of the service execution request, for example, may be the printing device 13, the image capture device 13, the measurement device 13, and the sorting device 13. The plurality of clients 12 may be considered as the front-end application software or the terminal device 13 that receives the service execution request sent by the server 11. With the server 11 and the client 12 in the present system, an interaction channel is provided for the service server 11 to perform service interaction with the service demand executor.

Generally, in a conventional application, a service demand executor may usually establish an interaction channel with a service server 11 by directly accessing a webpage, which is liable to the problem of unstable interaction mentioned in this embodiment. In this embodiment, the service execution request is more convenient for stable interaction at the service demand executor side by applying the server 11 and the client 12 between the service server 11 and the service demand executor.

In this embodiment, the plurality of devices 13 in the same physical space may establish a communication connection with the plurality of clients 12, and the communication connection may be implemented directly through a data line or establish wireless communication in a non-direct connection manner such as Bluetooth, WiFi, and near field communication. When several devices 13 are directly connected to the client 12 (for example, a printing device 13), the client 12 may drive the device 13 to respond to the service execution request through the integrated related device driver. When the plurality of devices 13 and the client 12 are not directly connected (for example, a large sorting device 13), the communication with the device 13 may be performed through a serial port or an interface service, to drive the target device to respond to the service execution request.

In view of the above, embodiments of the present disclosure provide the service management system 1, which acts as an assistance system that supports the service management system 1 to perform service interaction with a service demand executor. In a specific application, the service demander may generate a service execution request corresponding to the service requirement through the service server 11, and first transmit the service execution request to the server 11, and then the server 11 acts as an information relay and forwards the related service requirement to a corresponding client 12. The client 12 is denoted as the target client, so that the service demand executor may drive the target device in the plurality of devices 13 to respond to the service execution request through the target client, to implement corresponding service execution logic.

In this embodiment, responding to the service execution request generated on the service server 11 may be implemented as a core function of the service management system 1 provided in this embodiment. Specifically, the server 11 may first receive the service execution request sent by the service server 11, and then the server 11 may determine which target client corresponds to the service execution request by analyzing the target client identifier included in the service execution request, so that the service execution request may be forwarded to the target client. It should be known that the target client corresponding to the service execution request is not limited to one or more of the plurality of clients 12.

The service execution request may be considered as any service request that may be generated by the service demander based on the service server 11. Taking the service server 11 of the integrated warehouse management system as an example, the service execution request may be a transaction order issuing request, a transaction order printing request, or a sorting request of a commodity to be shipped. The service execution request may include target client identifier information for executing the request It is to be understood that not all clients 12 need to respond, and the client 12 receiving the service execution request often has directivity.

With reference to the foregoing description, the target client may receive the service execution request, and the target client may analyze the service execution request, to determine service information included in the service execution request. If it is determined that the service execution request is a service requirement participating in the device 13 in the plurality of devices 13 by analyzing the service information, the target client may determine a corresponding target device from the plurality of devices 13, and then the target client may determine, by using a pre-integrated device driving service, a target device driving service that matches the target device, and generate a driving instruction according to the target device driving service, to drive the target device to respond to the service execution request by using the driving instruction, to cause execution of the related service execution logic. The device driving service may be a device driving component used for device driving, or may be an interface or a serial port required to provide communication between the client 12 and the device 13.

In the service management system provided in this embodiment, it is provided an assistance system for supporting service interaction, which is different from an existing service execution logic that directly accesses a service server through a webpage link to obtain a service requirement and then controls a device related to a service requirement in another manner. In this technical solution, the service execution request may be delivered to the target client through a server in the provided system, and then the target client determines a target device associated with the service execution request and directly drives the target device to respond to the service execution logic of the service execution request. According to the service interaction process, the effective response of a device of the service execution party to the service execution request is achieved; meanwhile, the service execution request is forwarded to the target client through the server, the decoupling of the service server end for generating the service execution request and the service execution side is realized, so that the service server does not need to pay attention to differences of different devices in the software and hardware environment. Different devices can be directly adapted through the service management system provided by the embodiment, the interaction stability between the service server and the device is improved, and the effective response of the device to the service request related to the service server is also ensured.

Figure 2:
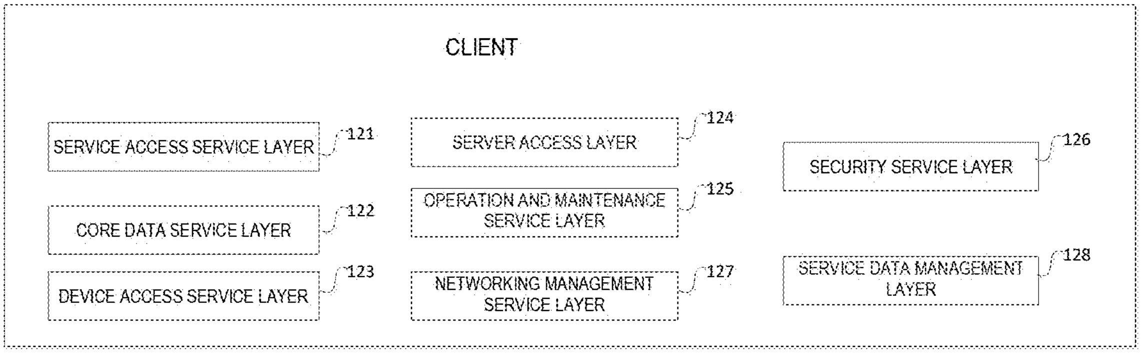
FIG. 2 is a structural block diagram of a client in a service management system according to an embodiment of the present disclosure.

For each client in a plurality of clients included in the system, on the basis of the foregoing embodiment, the client may be further optimized. Specifically, FIG. 2 shows a structural block diagram of a client in a service management system according to an embodiment of the present disclosure. As shown in FIG. 2, this embodiment may optimize the client which includes a service access service layer 121, a core data service layer 122, and a device access service layer 123. The device access service layer 123 provides a device driving service for the plurality of devices that have established communication connections, and the device driving service includes a device driving component. The service access service layer 121 is configured to receive a service execution request from the server through a provided external service interface, and determine an execution goal corresponding to the service execution request. The core data service layer 122 is configured to determine a target device from the plurality of devices by using the service information in the service execution request, obtain from the device access service layer 123 a target device driving service corresponding to the target device to generate the driving instruction for the target device, and drive the target device to respond to the service execution logic in the service information.

In this embodiment, the client needs to provide a communication path capable of responding to the service execution request generated by the service server. On this basis, in this embodiment, the service access service layer 121 is preferably set on the client, and service data aggregation may be performed in the service access service layer 121 to provide a callable external service interface for the service interaction, so as to receive the service execution request forwarded by the server based on the external service interface. In addition, the service data aggregated in the service access service layer 121 may further include a correlation function used for service execution request analysis to analyze the service execution request, so that an execution goal corresponding to the service execution request may be determined.

As described above, the client also needs to provide a communication path for communication interaction after establishing a communication connection with a plurality of devices. Based on this, in this embodiment, a device access service layer 123 for a plurality of devices is preferably set on the client, and a device access service corresponding to the plurality of devices may be included in the device access service layer 123.

In this embodiment, for a device that is directly connected to a client, the device access service may be specifically understood as a device driving component for driving the device to work, and the device driving component may provide a unified access standard for the devices that are directly connected to the client, thereby implementing control of the devices by the client. Meanwhile, for a hardware device that is not directly connected to the client, the device access service may be specifically understood as a universal protocol required for communication with the device, to provide a protocol for device communication such as Bluetooth, Rest, websocket, and serial port, and control of these devices by the client may also be implemented through these protocols.

It should be noted that, in this embodiment, by adding the client, flexible management of devices included in the service demand executor is achieved. For different service demand executors, by merely setting the communication standard required by the related device or the communication protocol on the client, effective control of the devices by the client can be achieved. Such technical implementation does not need to consider the influence of the own device on the service interaction due to the difference between the own device and another service demand executor, and better reflects the service interaction flexibility between the service demand executor and the service server. At the same time, in this embodiment, by using the configured service access service layer 121, only the influence of the service demand executor software environment on the service server may be considered, so that a proper callable access interface is configured, without considering the influence on the service interaction caused by different software environments and other service demand executors. The decoupling between the service demand executor and the service server is better achieved, and the service interaction effectiveness is ensured.

Similarly, the client provided in this embodiment further includes a core data service layer 122, and the core data service layer 122 may be used to store core data involved in normal operation of the entire client, transmit the involved service instructions, and perform hardware device address information determination, which may be considered as the core logic execution layer of the client.

Specifically, the core data service layer 122 stores routing address information of each device associated with the client, where the routing address information may be used as reference information for service execution, and is used for determining a target device and searching related communication addresses. During specific operations of the client, the core data service layer 122 may establish communication with the device access service layer 123 when determining that the execution object of the service execution request is the target device by analyzing the service information in the service execution request, to notify the device access service layer 123 to invoke the target device driving service associated with the target device. The target device determining service may be the target device driving component for generating a corresponding driving instruction to drive the target device to execute the service execution logic of the service execution request.

Before the service execution request is responded to by the target device, the service execution request may be converted into the regional device control instruction readable by the device through the core data service layer 122, so that the response of the target device to the service execution request is driven by the drive instruction, which can be also considered as to the response of the target device to the regional device control instruction. This embodiment ensures effective scheduling of the target device by using this conversion, so as to achieve effective execution of the target device on the service execution logic.

This embodiment has a specific optimization of the structure provided by the client, and better describes the response process of the client to the service execution request. Through mutual cooperation between the service access service layer 121, the core data service layer 122 and the device access service layer 123 in the client, the service server can effectively interact with the service requirements related to the service demand executor.

The above optimization of the client mainly realizes the effective response of the client to the service execution request, which solves the problem of unstable interaction in the service interaction. On the basis of the foregoing embodiment, the client may be further optimized by using this embodiment, to enrich the management form of the client on the involved service.

Specifically, as shown in FIG. 2, this embodiment may further optimize the client to include an operation and maintenance service layer 125 and a server access layer 124, where the server access layer 124 provides a transmission channel for performing data information transmission with the server; and the operation and maintenance service layer 125 comprises a configuration management module configured to, in response to triggering of the provided software configuration control, generate a corresponding software configuration request and submit the corresponding software configuration request to the server via the server access layer; and perform software configuration based on the software configuration data packet fed back by the server with respect to the software configuration request, wherein the software configuration data packet comprises environment configuration information, the service execution request being responded depending on the environment configuration information; and the remote operation and maintenance module is configured to report a detected operation abnormality problem to the server, receive a remote control request initiated by the server through a remote control interface of the server access layer, and provide a remote maintenance channel for solving the operation abnormality problem using the server.

In this embodiment, the service access service layer 121 included in the client may be specifically understood as a communication interaction used to implement service request of the server and the client. In the optimization of this embodiment, the client further includes a server access layer 124, which is different from the service access service layer 121. It may be considered that the server access layer 124 specifically provides a cloud edge intercommunication capability between the client and the server, which mainly provides a data information transmission channel for uploading and downloading data information for communication between the client and the server in the form of a software application toolkit.

It should be understood that, the service server wants to establish a service interaction with a service demand executor, and needs to perform some software configurations for interaction with the service server on the terminal device of the service demand executor, or install a plug-in on which some service interaction depend, so that the service demand executor can establish a matching interaction channel with the service server through the configured software environment or plug-in. In conventional applications, a technician is usually involved to manually implement configuration of the software environment or installation of the plug-in. Therefore, the whole process requires not only the investment of labor cost but also the effectiveness of the software environment configuration.

In this embodiment, the operation and maintenance service layer 125 is additionally provided in the client of the service management system. The software configuration involved in the service interaction may be automatically implemented through the configuration management module in the operation and maintenance service layer 125. The software configuration may include the configuration of the dependent software environment, or the installation of the involved plug-in. The software configuration data packet on which the software configuration depends may include the environment configuration information on which a response to the service execution request depends.

In a specific implementation, when a new service demand executor needs to establish a service connection with a service server, a plurality of clients may be set in a physical space of the service demand executor. A function item of a software configuration control may be presented in a client interface displayed after the client runs, and a technician may trigger the software configuration control. A configuration management module in the client upper operation and maintenance service layer 125 may respond to the trigger operation and generate a software configuration request, and the software configuration request may be submitted to the server through the server access layer 124.

As described above, the server pre-stores a software configuration data packet required for service interaction between the service server and the service demand executor. The software configuration data packet may be environment configuration information dependency which a manager of the service server relies on a software environment configuration formed in advance according to a service characteristic, or a plug-in installation package written in advance. After receiving the software configuration request sent by the client, the server may retrieve the stored software configuration data packet and deliver it to the client through the server access layer 124. The configuration management module may receive the software configuration data packet, and may implement one-key configuration of the software environment and the plug-in involved in the client by parsing the software configuration data packet.

It should be understood that, the service demand executor tends to be distributed over different regions, and the service demand executor interacts with the service of the service server. In this system, the plurality of clients that are set up in the physical space of the service demand executor mainly depend on a plurality of clients that are set up in the physical space of the service demand executor. To ensure that the service interaction between the service needs and the service server is performed normally, normal operation of the client needs to be ensured, and if the client is abnormal, technicians of the service demander need to participate in maintenance of the client. Because of the regional problem, it is difficult for a technician to complete maintenance work in a short time, thereby delaying normal business interaction.

On the basis of the above existing problems, in this embodiment, a remote operation and maintenance module is additionally arranged in the operation and maintenance service layer 125 of the client. Through the remote operation and maintenance module, the working state of the client may be detected in real time, when it is detected that the running of the client is abnormal, the related running abnormality problem may be determined and reported to the server through the server access layer 124. The related operation and maintenance personnel of the server may check the reported running abnormity problem in time, and may initiate a remote control request for the client at the server. The remote operation and maintenance module may respond to the remote control request through the remote control interface of the server access layer 124, to implement remote control of the server on the terminal device, and may further receive a remote maintenance operation that the server faces the abnormal operation problem.

With the server access layer 124 and the operation and maintenance service layer 125 added in the client in this embodiment, one-key configuration of the software environment depending on the software environment when the service demand executor and the service server perform service interaction can be achieved. Compared with the conventional implementation, the labor cost is effectively saved, and the software configuration accuracy is improved. Meanwhile, remote control maintenance of the client by the server side operation and maintenance personnel can be realized, the cost investment and time investment of operation and maintenance manpower are saved, and remote and automatic operation and maintenance are better realized.

On the basis of the above optimization, this embodiment further optimizes the function implementation of the server. Specifically, the server may be further configured to: after detecting that the client associated software has an updated version, send an update reminder of the client associated software to the plurality of clients through the server access layer.

It may be understood that there is an update requirement of software or a plug-in involved in service interaction between the service server and the service demand executor, and a technician of the service demander may perform service related software update according to the update requirement, and may feed back the software related update information to the server through the service server. Based on the software related update information fed back by the service server, the server may determine whether there is the detection of the to-be-updated software, and if it is detected that the to-be-updated software exists, determine again whether the software to be updated is the software facing the client. If yes, the to-be-updated software may be determined as the target software, and the updated version of the target software may be obtained, and then the update reminder of the target software may be sent to the client through the server access layer 124. The update reminder may be a message reminder or a mark reminder. For example, an update marker may be performed on an icon of the target software involved in the client.

On the basis of optimizing the server, the operation and maintenance service layer 125 on the client may further include: a remote upgrade module, configured to respond to an update trigger for the client associated software, and update the client associated software based on a software update data packet delivered by the server through the server access layer. The client association software includes: a device driving component related to the plurality of devices, and a configuration plugin that supports running of the service execution request.

The foregoing optimization solution of this embodiment provides remote update of software involved in service interaction by the service demand executor, and also achieves enrichment of functional requirements involved in the service interaction process.

In this embodiment, the operation and maintenance service layer 125 further adds an environment monitoring function and a log management function to the terminal device on which the client depends. Specifically, the operation and maintenance service layer 125 added on the client of this embodiment further includes an environment monitoring module, configured to monitor a hardware environment in operation of the client, and perform real-time reminder of the hardware environment monitoring result; and a log management module, configured to record and store a running log of a client at runtime, and upload the running log to the server through the server access layer.

In this embodiment, the environment monitoring module may provide, for the set client, a real-time monitoring function of the hardware environment in the running of the client to implement real-time monitoring of hardware (such as a central processing unit, a memory, a network card, a network speed, etc.) involved in running of the client. The log service module may provide a log recording and uploading service of the running log involved in the running process of the client, which may locally store the running log (including the running log of the service running in the service access layer, or the running log of the running of the hardware device involved in the working of the driving hardware device) on the terminal device, or upload the running log to the server through the server access layer 124 for storage.

According to the optimized technical solution of the embodiment as discussed above, the recording and uploading of the environment monitoring and the running log of the service demand executor terminal device are provided, and the enrichment of the functional requirements in the service interaction process is also realized.

In this embodiment, the security service layer 126 for performing security monitoring on the software running environment is additionally provided on the client. Specifically, the optimization client may further include a security service layer 126, where the security service layer 126 is configured to perform security monitoring on a software running environment of the client at runtime, perform security exception reminder in response to detecting that the client is in a non-secure environment, and enable an restriction on a service running permission; and is further configured to encrypt and store local data generated by the client at runtime based on a provided encryption policy.

In this embodiment, the security service layer 126 may provide security monitoring of the software environment by the client in operation, and can effectively detect and protect virus software such as Trojan horse. In a specific implementation of environmental safety monitoring, it is possible to determine that the abnormal reminder is in an unsafe environment when it is monitored that there is virus or abnormal software affecting the environment safety. At the same time, the running permission of the service running on the client may be limited, for example, the downloading or printing of the service data cannot be limited. In addition, a data encryption policy may also be provided to encrypt and store the generated local data of the client.

In this embodiment, through the above added security service layer 126, the leakage of the core confidential data in the running of the client can be effectively prevented, and the function implementation in the service interaction process is also enriched.

As another function extension of the client, as shown in FIG. 2, this embodiment may optimize that the client further includes a networking management service layer 127. The networking management service layer 127 may be configured to: in response to determining that the client acts as a networking host and a networking condition is met, perform networking broadcast, determine a first client for establishing a networking handshake communication from the plurality of clients, determine the first client as a networking slave, and upload formed networking slave information to the server.

In response to determining that the client does not act as a networking host and receiving a networking broadcast message, record a client sending the networking broadcast message as a second client, establish a networking handshake communication with the second client, determine the second client as a home networking host after determining that networking handshake is successful, and upload networking host information of the networking host to the server.

In this embodiment, the present system also considers networking configurations of several clients, that is, several clients included in the same service demand executor may be uniformly configured into one local area network, to implement networking communication between clients in the service demand executor. Specifically, in this embodiment, the networking management service layer 127 may be added to the client, and the networking management service layer 127 may first detect whether the client has been a networking host. Specifically, whether to serve as a networking host may be implemented by detecting whether a networking host marker exists, where the networking host mark may be determined and delivered by the server.

As described above, if it is detected that the networking host marker is currently received or present, the networking management service layer 127 may consider that the client to which the networking management service layer 127 belongs is used as the networking host, the networking condition to be met may be that there are other clients that do not belong to the same local area network in the plurality of clients. Then the networking management service layer 127 may send the networking broadcast to the physical space where the networking management service layer 127 is located, the networking broadcast may be received by other clients in the same physical space, after receiving the networking handshake communication with the other clients that receive the networking broadcast message, the other client may be denoted as the first client. Then, if it is determined that the networking handshake communication is completed with the first client, the first client may be used as the networking slave in the constructed local area network, and the final networking management service layer 127 further needs to upload the networking slave information corresponding to the networking slave that belongs to the client to the server, so that the server knows the networking condition of the client in real time.

As another implementation logic, if it is detected that the networking host marker is not currently received or absent, the networking management service layer 127 may consider that the client to which the networking management service layer 127 belongs does not serve as a networking host, and then may perform detection of whether to access the networking host. If it is detected that the client to which the networking host belongs does not access another networking host, the networking management service layer 127 may wait, and when receiving a networking broadcast message sent by another client in the same physical space, it may record another client sending the networking broadcast message as a second client, and establish a networking handshake communication with the second client, and record the home networking host after the networking handshake succeeds. For example, the second client may be recorded as a networking host. It may also upload the networking host information of the networking host to which the networking host belongs to the server, so that the server knows the networking condition of the client in real time.

Based on the foregoing optimization, this embodiment may further optimize a server. Specifically, the server may be configured to, in response to failing to detect a networking host at runtime from the plurality of clients, determine, from the plurality of clients, a third client as the networking host based on a predetermined networking host election policy, and transmit a networking host identifier to the third client; and the server is further configured to: construct networking information corresponding to the plurality of clients based on networking host information and/or networking slave information uploaded by the plurality of clients.

In this embodiment, the server may further preferably have a determining function for determining a networking host from a plurality of clients, and the timing determined by the networking host may be a networking host that is not currently detected in the running state. The cases where no networking host at runtime is detected may include a case in which no networking host is currently present in the plurality of clients, or may include a case in which the networking host is determined, but the networking host is currently powered off or is not in a normal working state.

In this embodiment, the networking host election policy may be selecting the terminal device with the longest online time as the networking host, or selecting the terminal device with the optimal performance as the networking host with a certain performance as a reference. Alternatively, it may be comprehensively considering some parameter attributes of the terminal device, and selecting the terminal device with the highest parameter attribute weight as the networking host.

In this embodiment, the server may also aggregate networking host information and/or networking information uploaded by the client to form networking information of the service demand executor, so as to be used to subsequently exchange data information with the service demand executor client.

Based on the above optimization, this embodiment may further optimize a server, and specifically, the server may be further configured to: receive service data information, and transmit the service data information to a client serving as a networking host in response to detecting that a service data cache transmitting condition is met.

It should be noted that, when a large-scale service requirement exists in a service server, a situation in which a service interaction needs to be performed frequently by using a server and a client occurs. In this case, network congestion is liable to be caused, frequent access of the client to the service server is disadvantageous for operation efficiency of the service demand executor. The above problem can be solved by the function added by the optimization of the present embodiment.

Specifically, the service server may send the related service data information to the server through interaction with the server. For the server, the delivered service data information may be received. Generally, the server may perform a conventional storage operation on the received service data information. However, when the service data cache issuing condition is met, the service data information received from the service server side may be delivered to a plurality of clients.

The service data caching condition may be detecting that the information amount of the service data information delivered by the service server within a predetermined time duration reaches a predetermined size. At this time, it may be considered that the service server is in a status where there are quite a lot of service demands. To relieve the communication pressure between the client and the server, this embodiment may only deliver the received service data information to the client that is the networking host through the server. The client of the networking host may be determined based on the established networking information.

In addition, the server may further deliver the service data information to a further client, among the plurality of clients, that is not in the same local area network.

With reference to the foregoing description, on the basis of the foregoing optimization, as shown in FIG. 2, the client also optimizes a service data management layer 128. The service data management layer 128 may be configured to: in response to acting as a networking host, receive the service data information from the server, determine a first to-be-distributed client based on a predetermined information distribution policy, and distribute the service data information to the first to-be-distributed client, so that the first to-be-distributed client locally caches the service data information; in response to not acting as the networking host, receive the service data information from f further client, determine a second to-be-distributed client based on the information distribution policy, and distribute the service data information to the second to-be-distributed client, so that the second to-be-distributed client locally caches the service data information; and upload, to the server, a service cache state corresponding to the service data information after the local caching of the service data information is completed, wherein the first to-be-distributed client and the second to-be-distributed client are both clients that have not received the service data information in a same network; and other clients are clients that have received the service data information in the same network.

In this embodiment, the client needs to further store and distribute the service data information delivered by the server, where the execution of the distribution processing may be further divided according to whether a networking host is used. Specifically, a client that is a networking host may directly receive, via the service data management layer 128, the service data information delivered by the server, determine a first to-be-distributed client according to a predetermined information distribution policy, and distribute the service data information to the first to-be-distributed client, so that the first to-be-distributed client locally caches the service data information. For a client that is not used as a networking host, it may receive, via the service data management layer 128, the service data information from another client that has received service data information, determine a second to-be-distributed client according to the information distribution policy, and distribute the service data information to the second to-be-distributed client, so that the second to-be-distributed client locally caches the service data information.

As described above, the predetermined information distribution strategy may be a limitation on the maximum distributable quantity. Assuming that the maximum distributable quantity is N, the service data management layer 128 may select N clients that do not receive the service data information from the plurality of clients, and use the N clients as the first to-be-distributed client, and send the service data information to each first to-be-distributed client.

It should be note that, for a client that is not used as a networking host, it may determine, based on the service data management layer 128, whether service data information delivered by a further client is received. If the service data information is not received, it is in a waiting state, and if the service data information is received, N clients that do not receive service data information may also be selected from a plurality of clients, and the N clients are used as second to-be-distributed clients, and service data information is sent to each second to-be-distributed client. The further client may be a client that is a networking host, or a client that has received service data information.

It can be seen that, in the distribution process of the service data information, each time the distributed client grows exponentially, the distribution form also better improves the distribution speed of the service data information at the service demand executor. In addition, it can be understood that, when the client that receives the service data information is provided with the service processing request, the service data information can be directly called as long as the service data information requested to be processed has been stored, without the necessity to request the service server for the data through the network. This way of access also alleviates the network pressure in the service interaction in a better way, and meanwhile, the service interaction efficiency is greatly improved.

In order to better understand the service interaction assistance and management function of the service management system provided in this embodiment when the service server interacts with the service demand executor, this embodiment illustratively describes the function implementation of the service management system based on the method example executable by the service management system.

Specifically, in the following exemplary description, the service demand executor takes an e-commerce warehouse as an example, and the service server takes an e-commerce service server involved in network shopping as an example. The e-commerce service server may be erected on an e-commerce service serving platform, and on this basis, the server in the service management system provided in this embodiment may also be configured on the e-commerce service serving platform; and the client may be set up in the e-commerce warehouse. In addition, the e-commerce warehouse further includes a plurality of devices that execute service execution requests, such as a printing device and a sorting device.

Figure 3:
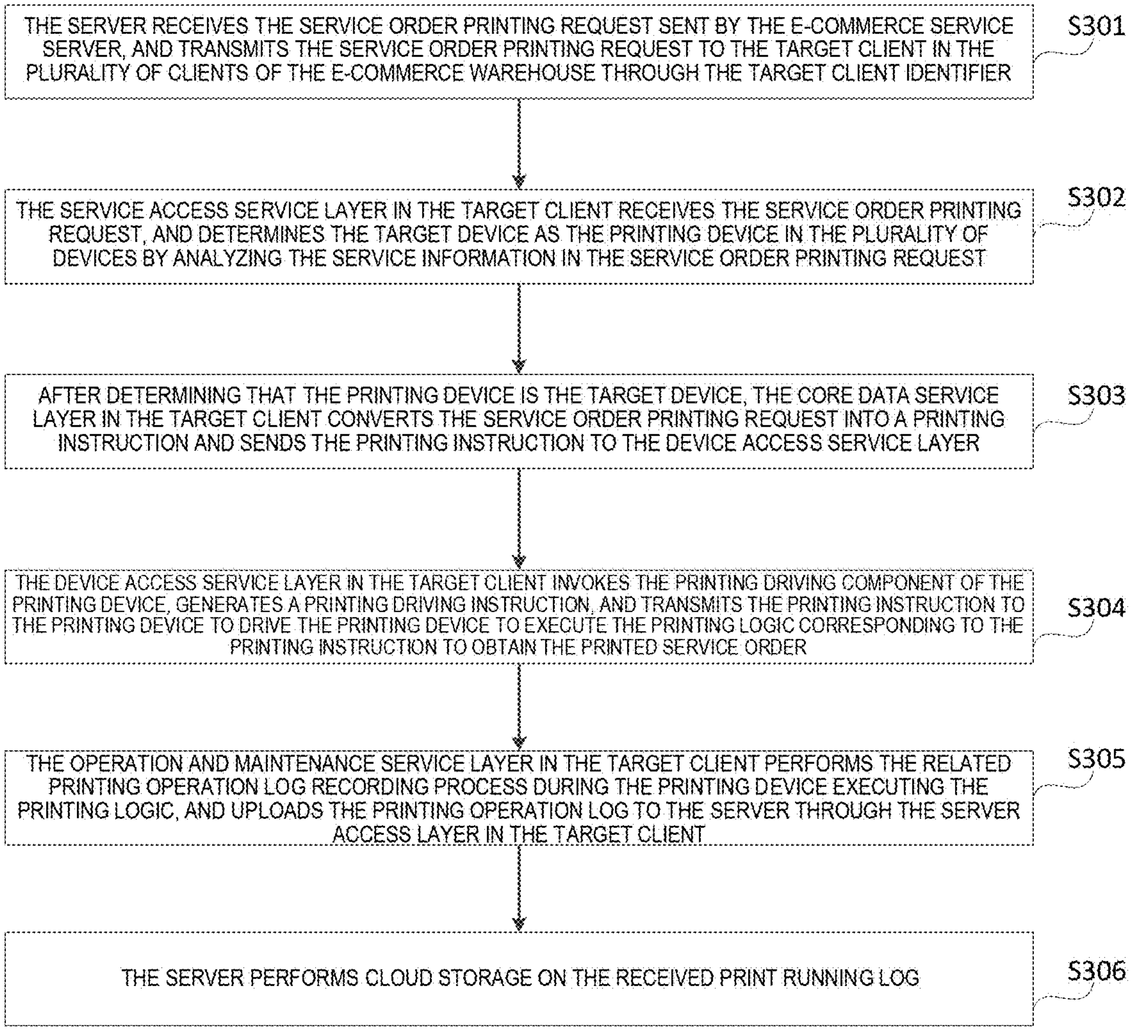
FIG. 3 is a schematic flowchart of implementing a practical operation service response by using the service management system according to this embodiment.

First, in this embodiment, the service order printing is implemented as a practical service example based on the service management system, to describe the execution flow of the service order printing method. FIG. 3 is a schematic flowchart of implementing a practical operation service response by a service management system according to an embodiment. As shown in FIG. 3, the method flow may include the following steps.

S301: The server receives the service order printing request sent by the e-commerce service server, and transmits the service order printing request to the target client in the plurality of clients of the e-commerce warehouse through the target client identifier.

S302: The service access service layer in the target client receives the service order printing request, and determines the target device as the printing device in the plurality of devices by analyzing the service information in the service order printing request.

S303: After determining that the printing device is the target device, the core data service layer in the target client converts the service order printing request into a printing instruction and sends the printing instruction to the device access service layer.

S304: The device access service layer in the target client invokes the printing driving component of the printing device, generates a printing driving instruction, and transmits the printing instruction to the printing device to drive the printing device to execute the printing logic corresponding to the printing instruction to obtain the printed service order.

S305: The operation and maintenance service layer in the target client performs the related printing operation log recording process during the printing device executing the printing logic, and uploads the printing operation log to the server through the server access layer in the target client.

S306: The server performs cloud storage on the received print running log.

Figure 4:
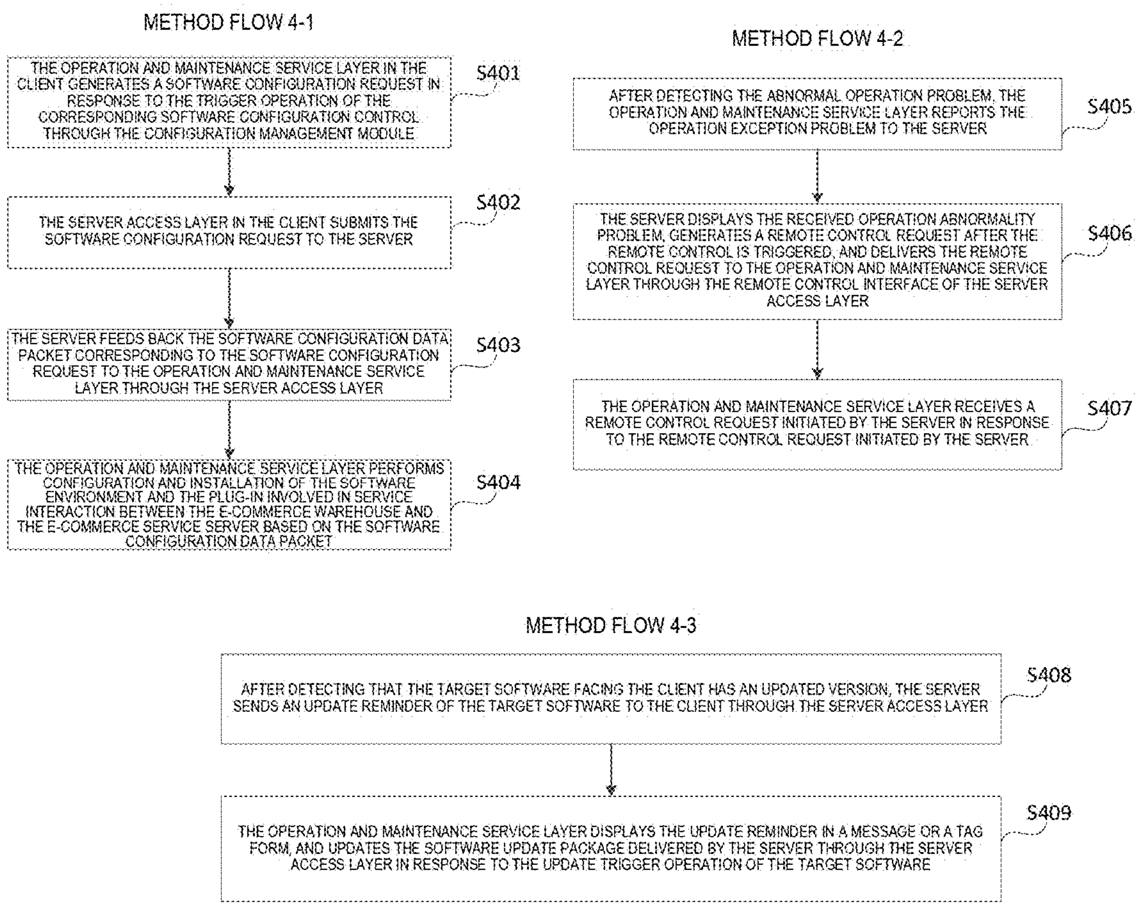
FIG. 4 is a schematic flowchart of a logic for implementing an operation and maintenance method involving a client by the service management system provided in this embodiment.

For another example, this embodiment provides an example of implementing operation and maintenance related operations on the e-commerce warehouse side of the service management system. FIG. 4 is a schematic flowchart of implementing logic of an operation and maintenance method involved in a client by using the service management system provided in this embodiment. As shown in FIG. 4, the method flow may include the following.

Method Flow 4-1

S401: The operation and maintenance service layer in the client generates a software configuration request in response to the trigger operation of the corresponding software configuration control through the configuration management module.

S402: The server access layer in the client submits the software configuration request to the server.

S403: The server feeds back the software configuration data packet corresponding to the software configuration request to the operation and maintenance service layer through the server access layer.

S404: The operation and maintenance service layer performs configuration and installation of the software environment and the plug-in involved in service interaction between the e-commerce warehouse and the e-commerce service server based on the software configuration data packet.

Method Flow 4-2

S405: After detecting the abnormal operation problem, the operation and maintenance service layer reports the operation exception problem to the server.

S406: The server displays the received operation abnormality problem, generates a remote control request after the remote control is triggered, and delivers the remote control request to the operation and maintenance service layer through the remote control interface of the server access layer.

S407: The operation and maintenance service layer receives a remote control request initiated by the server in response to the remote control request initiated by the server.

Method Flow 4-3

S408: After detecting that the target software facing the client has an updated version, the server sends an update reminder of the target software to the client through the server access layer.

S409: The operation and maintenance service layer displays the update reminder in a message or a tag form, and updates the software update package delivered by the server through the server access layer in response to the update trigger operation of the target software.

Figure 5:
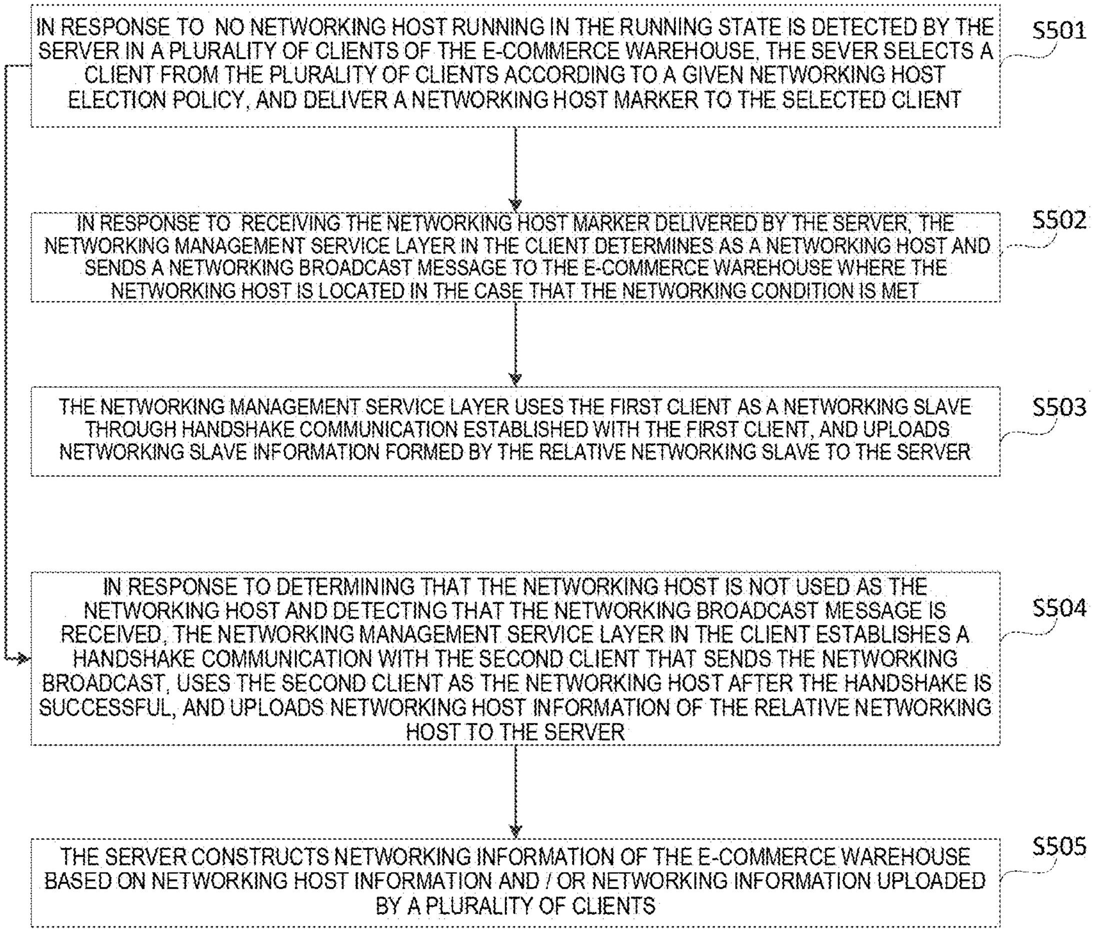
FIG. 5 is a schematic flowchart of a logic for implementing a networking method involving a client by a service management system according to this embodiment.

For another example, this embodiment provides an example in which the service management system implements local area networking on the e-commerce warehouse side. FIG. 5 is a schematic flowchart of implementing networking method logic involved in a client by a service management system according to this embodiment. As shown in FIG. 5, the method flow may include the following steps.

S501: In response to that no networking host running in the running state is detected by the server in a plurality of clients of the e-commerce warehouse, the sever selects a client from the plurality of clients according to a given networking host election policy, and deliver a networking host marker to the selected client.

S502: In response to receiving the networking host marker delivered by the server, the networking management service layer in the client determines as a networking host and sends a networking broadcast message to the e-commerce warehouse where the networking host is located in the case that the networking condition is met.

S503: The networking management service layer uses the first client as a networking slave through handshake communication established with the first client, and uploads networking slave information formed by the relative networking slave to the server.

S504: In response to determining that the networking host is not used as the networking host and detecting that the networking broadcast message is received, the networking management service layer in the client establishes a handshake communication with the second client that sends the networking broadcast, uses the second client as the networking host after the handshake is successful, and uploads networking host information of the relative networking host to the server.

S505: The server constructs networking information of the e-commerce warehouse based on networking host information and/or networking information uploaded by a plurality of clients.

Figure 6:
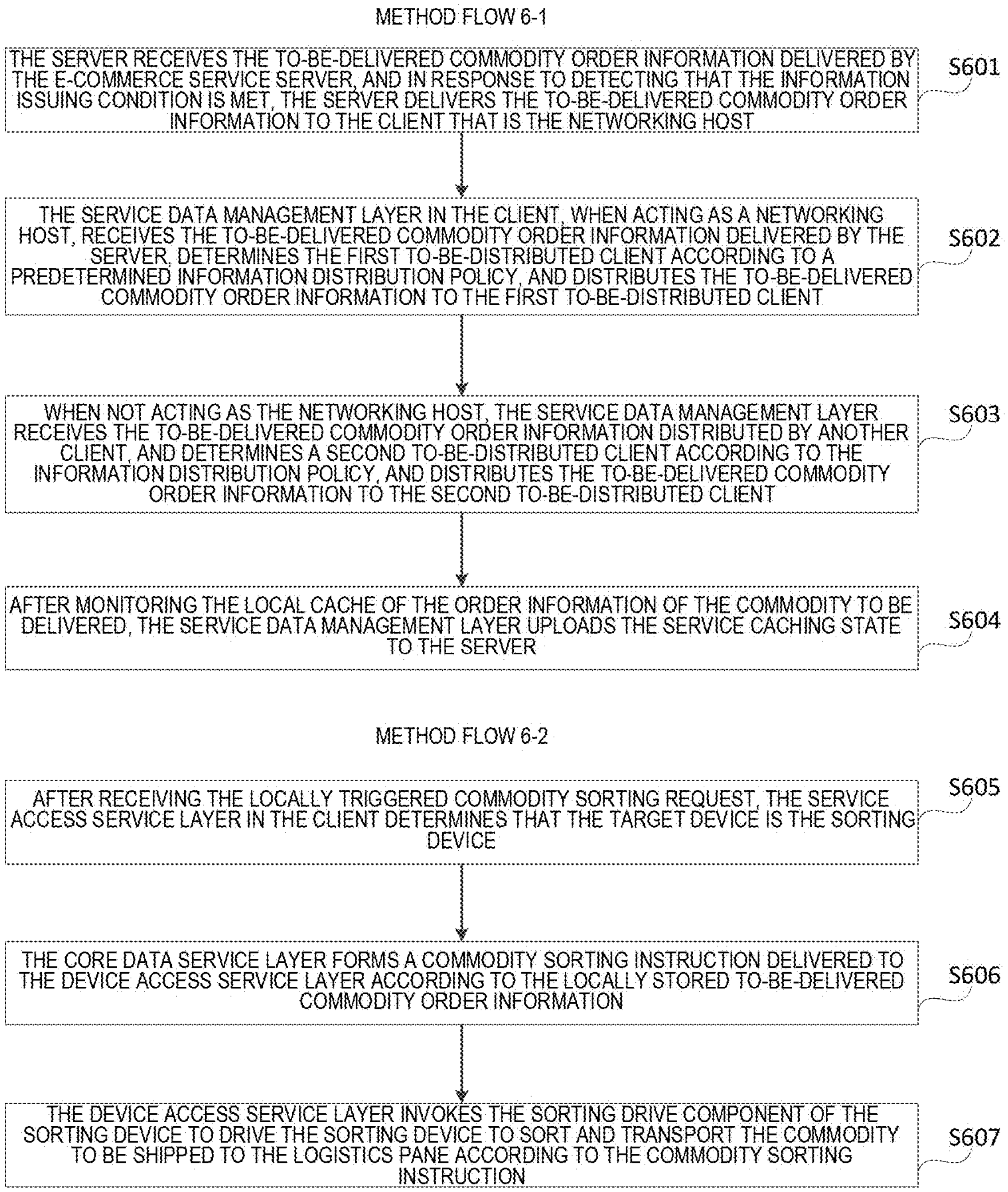
FIG. 6 is a schematic flowchart of a logic for implementing caching and distributing service data information to a client by a service management system according to an embodiment.

For another example, this embodiment provides an example in which a service management system caches and distributes service data information in a service server. FIG. 6 is a schematic flowchart of logic of a method for implementing service data information to a client cache and distribution by a service management system according to an embodiment. As shown in FIG. 6, the method logic may include the following.

Method Flow 6-1

S601: The server receives the to-be-delivered commodity order information delivered by the e-commerce service server, and in response to detecting that the information issuing condition is met, the server delivers the to-be-delivered commodity order information to the client that is the networking host.

S602: The service data management layer in the client, when acting as a networking host, receives the to-be-delivered commodity order information delivered by the server, determines the first to-be-distributed client according to a predetermined information distribution policy, and distributes the to-be-delivered commodity order information to the first to-be-distributed client.

S603: When not acting as the networking host, the service data management layer receives the to-be-delivered commodity order information distributed by another client, and determines a second to-be-distributed client according to the information distribution policy, and distributes the to-be-delivered commodity order information to the second to-be-distributed client.

S604: After monitoring the local cache of the order information of the commodity to be delivered, the service data management layer uploads the service caching state to the server.

Method Flow 6-2

S605: After receiving the locally triggered commodity sorting request, the service access service layer in the client determines that the target device is the sorting device.

S606: The core data service layer forms a commodity sorting instruction delivered to the device access service layer according to the locally stored to-be-delivered commodity order information.

S607: The device access service layer invokes the sorting drive component of the sorting device to drive the sorting device to sort and transport the commodity to be shipped to the logistics pane according to the commodity sorting instruction.

Figure 7:
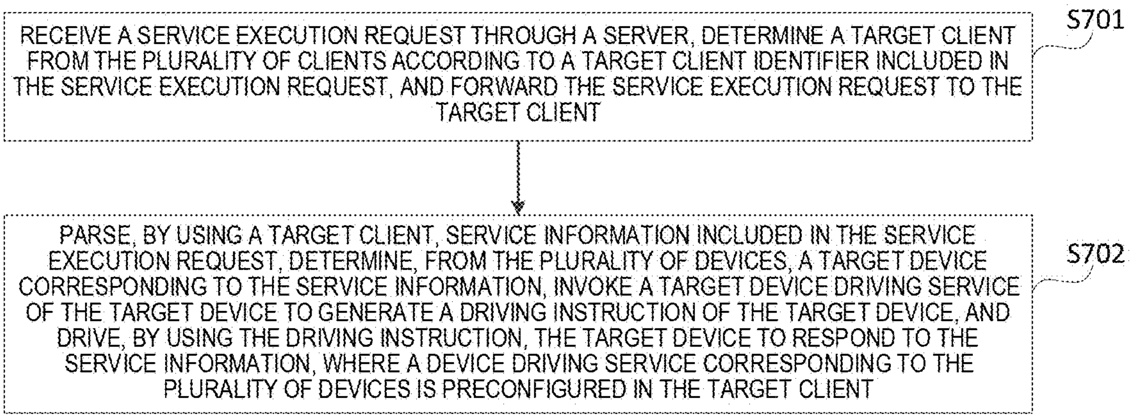
FIG. 7 is a schematic flowchart of a service management method according to an embodiment of the present disclosure.

FIG. 7 is a schematic flowchart of a service management method according to an embodiment of the present disclosure. The service management method is performed by the service management system as discussed above in this embodiment and is used for managing response(s) to the service execution request in the service interaction. As shown in FIG. 7, the method may include the following steps.

S701: receive a service execution request through a server, determine a target client from the plurality of clients according to a target client identifier included in the service execution request, and forward the service execution request to the target client.

S702: parse, by using a target client, service information included in the service execution request, determine, from the plurality of devices, a target device corresponding to the service information, invoke a target device driving service of the target device to generate a driving instruction of the target device, and drive, by using the driving instruction, the target device to respond to the service information, where a device driving service corresponding to the plurality of devices is preconfigured in the target client.

The service management method provided in this embodiment is specifically performed by the service management system provided in this embodiment, where the service management system can be considered as an assistance system that supports service interaction, which is different from an existing service server that directly accesses a service server through a webpage link to obtain a service requirement, and then controls, in other manners, a device involved in a service requirement to execute service logic. In the implementation of the method of this embodiment, the service execution request may be delivered to the target client through a server in the provided system, and then the target client determines the target device associated with the service execution request and directly drives the target device to respond to the service execution logic of the service execution request. According to the whole service interaction, the effective response of the device of the service execution party to the service execution request is achieved; meanwhile, the service execution request is forwarded to the target client through the server, the decoupling of the service server end for generating the service execution request and the service execution side is realized, so that the service server does not need to pay attention to the differences of different devices in the software and hardware environment, different devices can be directly adapted through the service management system provided by the embodiment, the interaction stability between the service server and a device is better improved, and the effective response of the device to the service request related to the service server is also ensured.

Figure 8:
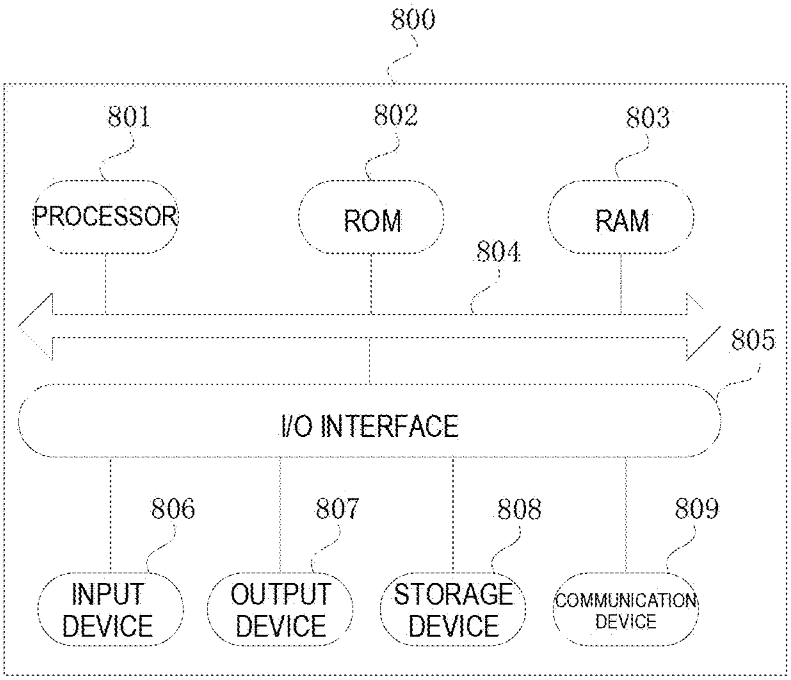
FIG. 8 is a schematic structural diagram of a computer device according to an embodiment of the present disclosure.

FIG. 8 is a schematic structural diagram of a computer device according to an embodiment of the present disclosure. FIG. 8 is a schematic structural diagram of a computer device (for example, the terminal device or the server in FIG. 8) 800 suitable for implementing the embodiments of the present disclosure. The terminal device in the embodiments of the present disclosure may include, but is not limited to, a mobile terminal such as a mobile phone, a laptop, a digital broadcast receiver, a PDA (personal digital assistant), a PAD (tablet computer), a PMP (portable multimedia player), and the like, and a fixed terminal such as a digital TV, a desktop computer, or the like. The computer device shown in FIG. 8 is merely an example, and should not impose any limitation on the functions and scope of use of the embodiments of the present disclosure.

As shown in FIG. 8, the computer device 800 may include a processing device (for example, a central processing unit, a graphics processor, etc.) 801, which may perform various appropriate actions and processing according to a program stored in a read-only memory (ROM) 802 or a program loaded into a random access memory (RAM) 803 from a storage device 808. In the RAM 803, various programs and data required by the operation of the computer device 800 are also stored. The processing device 801, the ROM 802, and the RAM 803 are connected to each other through a bus 805. An edit/output (I/O) interface 807 is also connected to the bus 805.

Generally, the following devices may be connected to the I/O interface 804: an input device 806 including, for example, a touch screen, a touchpad, a keyboard, a mouse, a camera, a microphone, an accelerometer, a gyroscope, etc.; an output device 807 including, for example, a liquid crystal display (LCD), a speaker, a vibrator, etc.; a storage device 808 including, for example, a magnetic tape, a hard disk, etc.; and a communication device 809. Communication device 809 may allow computer device 800 to communicate wirelessly or wired with other devices to exchange data. Although FIG. 8 illustrates a computer device 800 having various devices, it should be understood that it is not required to implement or have all illustrated devices. More or fewer devices may alternatively be implemented or provided.

The computer device 800 provided in this embodiment may be used as a client in the service management system provided in the foregoing embodiment, or may be used as a server.

In particular, according to an embodiment of the present disclosure, the process described above with reference to the flowchart may be implemented as a computer software program. For example, embodiments of the present disclosure include a computer program product comprising a computer program embodied on a non-transitory computer readable medium, the computer program comprising program code for performing the method shown in the flowchart. In such embodiments, the computer program may be downloaded and installed from the network through the communication device 809, or installed from the storage device 808, or from the ROM 802. When the computer program is executed by the processing apparatus 801, the client or the server in the service management system disclosed in the embodiments of the present disclosure is executed.

The names of messages or information interaction between multiple devices in embodiments of the present disclosure are for illustrative purposes only and are not intended to limit the scope of such messages or information.

The computer device provided in the embodiments of the present disclosure and the service management system provided in the foregoing embodiments belong to the same inventive concept, technical details not described in detail in this embodiment may refer to the foregoing embodiments, and this embodiment has the same beneficial effects as the foregoing embodiments.

An embodiment of the present disclosure provides a computer storage medium, where a computer program is stored, and when the program is executed by a processor, the application access method provided in the foregoing embodiments is implemented.

It should be noted that the computer-readable medium described above may be a computer readable signal medium, a computer readable storage medium, or any combination of the foregoing two. The computer-readable storage medium may be, for example, but not limited to, an electrical, magnetic, optical, electromagnetic, infrared, or semiconductor system, device, or device, or any combination thereof. More specific examples of computer-readable storage media may include, but are not limited to, an electrical connection having one or more wires, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the foregoing. In the present disclosure, a computer-readable storage medium may be any tangible medium containing or storing a program that may be used by or in connection with an instruction execution system, apparatus, or device. In the present disclosure, a computer readable signal medium may include a data signal propagated in baseband or as part of a carrier, where the computer readable program code is carried. Such propagated data signals may take a variety of forms including, but not limited to, electromagnetic signals, optical signals, or any suitable combination of the foregoing. The computer readable signal medium may also be any computer readable medium other than a computer readable storage medium that may send, propagate, or transmit a program for use by or in connection with an instruction execution system, apparatus, or device. The program code embodied on the computer-readable medium may be transmitted with any suitable medium, including, but not limited to: wires, optical cables, RF (radio frequency), and the like, or any suitable combination of the foregoing.

In some implementations, the client, server may communicate using any currently known or future developed network protocol, such as HTTP (HyperText Transfer Protocol), and may be interconnected with any form or medium of digital data communication (e.g., a communication network). Examples of communication networks include local area networks ("LANs"), wide area networks ("WANs"), internets (e.g., the Internet), and peer-to-peer networks (e.g., ad hoc peer-to-peer networks), as well as any currently known or future developed networks.

The computer-readable medium described above may be included in the electronic device; or may be separately present without being assembled into the electronic device.

The computer-readable medium carries one or more programs, and when the one or more programs are executed by the electronic device, the electronic device is caused to:

The computer-readable medium carries one or more programs, and when the one or more programs are executed by the electronic device, the electronic device is caused to: determine current resource usage information corresponding to each resource item on the execution terminal in application software running; determine, according to the current resource usage information, a target resource item currently meeting a resource allocation early warning condition; and adjust resource allocation logic of each target resource item in application software running.

Computer program code for performing the operations of the present disclosure may be written in one or more programming languages, including, but not limited to, object oriented programming languages such as Java, Smalltalk, C++, and conventional procedural programming languages, such as the "C" language or similar programming languages. The program code may execute entirely on a user computer, partially on a user computer, as a stand-alone software package, partially on a user computer, partially on a remote computer, or entirely on a remote computer or server. In the case of a remote computer, the remote computer may be connected to the user computer through any kind of network, including a local area network (LAN) or a wide area network (WAN), or may be connected to an external computer (e.g., connected through the Internet using an Internet service provider).

The flowcharts and block diagrams in the figures illustrate architecture, functionality, and operation of possible implementations of systems, methods, and computer program products according to various embodiments of the present disclosure. In this regard, each block in the flowchart or block diagram may represent a module, program segment, or portion of code that includes one or more executable instructions for implementing the specified logical function. It should also be noted that in some alternative implementations, the functions noted in the blocks may also occur in a different order than that illustrated in the figures. For example, two consecutively represented blocks may actually be performed substantially in parallel, which may sometimes be performed in the reverse order, depending on the functionality involved. It is also noted that each block in the block diagrams and/or flowcharts, as well as combinations of blocks in the block diagrams and/or flowcharts, may be implemented with a dedicated hardware-based system that performs the specified functions or operations, or may be implemented in a combination of dedicated hardware and computer instructions.

The units involved in the embodiments of the present disclosure may be implemented in software, or may be implemented in hardware. For example, the first obtaining unit may be further described as "obtaining at least two units of Internet Protocol addresses".

The functions described above may be performed, at least in part, by one or more hardware logic components. For example, without limitation, exemplary types of hardware logic components that may be used include: field programmable gate arrays (FPGAs), application specific integrated circuits (ASICs), application specific standard products (ASSPs), system-on-a-chip (SOCs), complex programmable logic devices (CPLDs), and the like.

In the context of the present disclosure, a machine-readable medium may be a tangible medium that may contain or store a program for use by or in connection with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, devices, or devices, or any suitable combination of the foregoing. More specific examples of machine-readable storage media may include electrical connections based on one or more lines, portable computer disks, hard disks, random access memory (RAM), read-only memory (ROM), erasable programmable read-only memory (EPROM or Flash memory), optical fibers, portable compact disc read-only memory (CD-ROM), optical storage devices, magnetic storage devices, or any suitable combination of the foregoing.

The above description is merely an illustration of the preferred embodiments of the present disclosure and the principles of the application. It should be understood by those skilled in the art that the disclosure in the present disclosure is not limited to the technical solutions of the specific combination of the above technical features, and should also cover other technical solutions formed by any combination of the above technical features or their equivalent features without departing from the above disclosed concept. For example, the above features are the technical solutions formed by mutually replacing technical features disclosed in the present disclosure (but not limited to).

Further, while operations are depicted in a particular order, this should not be understood to require that these operations be performed in the particular order shown or in sequential order. In certain circumstances, multitasking and parallel processing may be advantageous. Likewise, while details are included in the discussion above, these should not be construed as limiting the scope of the present disclosure. Certain features described in the context of separate embodiments may also be implemented in combination in a single embodiment. Conversely, the various features described in the context of a single embodiment may also be implemented in multiple embodiments either individually or in any suitable sub-combination.

Although the present subject matter has been described in language specific to structural features and/or methodological acts, it is to be understood that the subject matter defined in the appended claims is not necessarily limited to the specific features or acts described above. Rather, the specific features and acts described above are merely exemplary forms of implementing the claims.

We claim:

1. A service management system, comprising: a server, a plurality of devices, and a plurality of clients establishing a communication connection with the plurality of devices;

the server is configured to receive a service execution request, determine a target client from the plurality of clients based on an identifier of a target client comprised in the service execution request, and forward the service execution request to the target client; and the target client is configured to parse service information comprised in the service execution request, determine a target device corresponding to the service information from the plurality of devices, generate a driving instruction for the target device by invoking a target device driving service of the target device, and drive the target device with the driving instruction to respond to the service information, wherein the target client is pre-configured with device driving services corresponding to the plurality of devices, wherein for a client in the plurality of clients, the client further comprises a service data management layer configured to:

obtain service data information;

distribute, based on information distribution policy, the service data information to a further client that has not received the service data information in a same network, so that the further client locally caches the service data information; and upload, to the server, a service cache state corresponding to the service data information after the local caching of the service data information is completed.

2. The system of claim 1, wherein each client in the plurality of clients comprises: a service access service layer, a core data service layer and a device access service layer, wherein the device access service layer provides a device driving service for the plurality of devices that have established communication connections, and the device driving service comprises a device driving component;

the service access service layer is configured to receive a service execution request from the server through a provided external service interface; and the core data service layer is configured to determine a target device from the plurality of devices by using the service information in the service execution request, obtain from the device access service layer a target device driving service corresponding to the target device to generate the driving instruction for the target device, and drive the target device to respond to the service execution logic in the service information.

3. The system of claim 1, wherein each of the plurality of clients further comprises: an operation and maintenance service layer and a server access layer, wherein the server access layer provides a transmission channel for performing data information transmission with the server;

the operation and maintenance service layer comprises a configuration management module configured to, in response to triggering of the provided software configuration control, generate a corresponding software configuration request and submit the corresponding software configuration request to the server via the server access layer; and perform software configuration based on the software configuration data packet fed back by the server with respect to the software configuration request, wherein the software configuration data packet comprises environment configuration information, the service execution request being responded depending on the environment configuration information; and the remote operation and maintenance module is configured to report a detected abnormal operation problem to the server, receive a remote control request initiated by the server through a remote control interface of the server access layer, and provide a remote maintenance channel for solving the abnormal operation problem using the server.

4. The system of claim 3, wherein the server is further configured to: after detecting that a client associated software has an updated version, send an update reminder of the client associated software to the plurality of clients through the server access layer;

the operation and maintenance service layer further includes: a remote upgrade module, configured to respond to an update trigger for the client associated software, and update the client associated software based on a software update data packet delivered by the server through the server access layer; and the client association software comprises: a device driving component related to the plurality of devices, and a configuration plugin that supports running of the service execution request.

5. The system of claim 3, wherein the operation and maintenance service layer further comprises:

an environment monitoring module configured to monitor a hardware environment in operation of a client, and perform real-time reminder of a hardware environment monitoring result; and a log management module configured to record and store a running log of a client at runtime, and upload the running log to the server through the server access layer.

6. The system of claim 1, wherein each client in the plurality of clients further comprises: a security service layer, wherein the security service layer is configured to perform security monitoring on a software running environment of the client at runtime, perform security exception reminder in response to detecting that the client is in a non-secure environment, and enable an restriction on a service running permission; and is further configured to encrypt and store local data generated by the client at runtime based on a provided encryption policy.

7. The system of claim 1, wherein each client in the plurality of clients further comprises a networking management service layer configured to:

in response to determining that the client acts as a networking host and a networking condition is met, perform networking broadcast, determine a first client for establishing a networking handshake communication from the plurality of clients, determine the first client as a networking slave, and upload formed networking slave information to the server; and in response to determining that the client does not act as a networking host and receiving a networking broadcast message, record a client sending the networking broadcast message as a second client, establish a networking handshake communication with the second client, determine the second client as a home networking host after determining that networking handshake is successful, and upload networking host information of the networking host to the server.

8. The system of claim 7, wherein the server is configured to:

in response to failing to detect a networking host at runtime from the plurality of clients, determine, from the plurality of clients, a third client as the networking host based on a predetermined networking host election policy, and transmit a networking host identifier to the third client; and the server is further configured to: construct networking information corresponding to the plurality of clients based on networking host information and/or networking slave information uploaded by the plurality of clients.

9. The system of claim 1, wherein the server is further configured to:

receive the service data information, and transmit the service data information to a client serving as a networking host in response to detecting that a service data cache transmitting condition is met.

10. The system of claim 9, wherein the service data management layer of the client is configured to:

in response to acting as a networking host, receive the service data information from the server, determine the further client that has not received the service data information in the same network based on the information distribution policy, and distribute the service data information to the further client, so that the further client locally caches the service data information;

in response to not acting as the networking host, receive the service data information from other clients that have received the service data information in the same network, determine the further client that has not received the service data information in the same network based on the information distribution policy, and distribute the service data information to the further client, so that the further client locally caches the service data information.

11. A service management method, comprising:

receiving a service execution request by a server, determining a target client from a plurality of clients based on an identifier of a target client comprised in the service execution request, and forwarding the service execution request to the target client, wherein the plurality of clients establish a communication connection with the plurality of devices; and parsing, by a target client, service information comprised in the service execution request, determining, from the plurality of devices, a target device corresponding to the service information, generating a driving instruction for the target device by invoking a target device driving service of the target device, and driving the target device with the driving instruction to respond to the service information, wherein the target client is pre-configured with device driving services corresponding to the plurality of devices, wherein for a client in the plurality of clients, the client further comprises a service data management layer configured to:

obtain service data information;

distribute, based on information distribution policy, the service data information to a further client that has not received the service data information in a same network, so that the further client locally caches the service data information; and upload, to the server, a service cache state corresponding to the service data information after the local caching of the service data information is completed.

12. The method of claim 11, wherein each client in the plurality of clients comprises: a service access service layer, a core data service layer and a device access service layer, wherein the device access service layer provides a device driving service for the plurality of devices that have established communication connections, and the device driving service comprises a device driving component;

the service access service layer is configured to receive a service execution request from the server through a provided external service interface; and the core data service layer is configured to determine a target device from the plurality of devices by using the service information in the service execution request, obtain from the device access service layer a target device driving service corresponding to the target device to generate the driving instruction for the target device, and drive the target device to respond to the service execution logic in the service information.

13. The method of claim 11, wherein each of the plurality of clients further comprises: an operation and maintenance service layer and a server access layer, wherein the server access layer provides a transmission channel for performing data information transmission with the server;

the operation and maintenance service layer comprises a configuration management module configured to, in response to triggering of the provided software configuration control, generate a corresponding software configuration request and submit the corresponding software configuration request to the server via the server access layer; and perform software configuration based on the software configuration data packet fed back by the server with respect to the software configuration request, wherein the software configuration data packet comprises environment configuration information, the service execution request being responded depending on the environment configuration information; and the remote operation and maintenance module is configured to report a detected abnormal operation problem to the server, receive a remote control request initiated by the server through a remote control interface of the server access layer, and provide a remote maintenance channel for solving the abnormal operation problem using the server.

14. The method of claim 13, wherein the server is further configured to: after detecting that a client associated software has an updated version, send an update reminder of the client associated software to the plurality of clients through the server access layer;

the operation and maintenance service layer further includes: a remote upgrade module, configured to respond to an update trigger for the client associated software, and update the client associated software based on a software update data packet delivered by the server through the server access layer; and the client association software comprises: a device driving component related to the plurality of devices, and a configuration plugin that supports running of the service execution request.

15. The method of claim 13, wherein the operation and maintenance service layer further comprises:

an environment monitoring module configured to monitor a hardware environment in operation of a client, and perform real-time reminder of a hardware environment monitoring result; and a log management module configured to record and store a running log of a client at runtime, and upload the running log to the server through the server access layer.

16. The method of claim 11, wherein each client in the plurality of clients further comprises: a security service layer, wherein the security service layer is configured to perform security monitoring on a software running environment of the client at runtime, perform security exception reminder in response to detecting that the client is in a non-secure environment, and enable an restriction on a service running permission; and is further configured to encrypt and store local data generated by the client at runtime based on a provided encryption policy.

17. The method of claim 11, wherein each client in the plurality of clients further comprises a networking management service layer configured to:

in response to determining that the client acts as a networking host and a networking condition is met, perform networking broadcast, determine a first client for establishing a networking handshake communication from the plurality of clients, determine the first client as a networking slave, and upload formed networking slave information to the server; and in response to determining that the client does not act as a networking host and receiving a networking broadcast message, record a client sending the networking broadcast message as a second client, establish a networking handshake communication with the second client, determine the second client as a home networking host after determining that networking handshake is successful, and upload networking host information of the networking host to the server.

18. The method of claim 11, wherein the server is further configured to:

receive service data information, and transmit the service data information to a client serving as a networking host in response to detecting that a service data cache transmitting condition is met.

19. The method of claim 18, wherein the service data management layer of the client is configured to:

in response to acting as a networking host, receive the service data information from the server, determine the further client that has not received the service data information in the same network based on the information distribution policy, and distribute the service data information to the further client, so that the further client locally caches the service data information;

in response to not acting as the networking host, receive the service data information from other clients that have received the service data information in the same network determine the further client that has not received the service data information in the same network based on the information distribution policy, and distribute the service data information to the further client, so that the further client locally caches the service data information.

20. A computer device, comprising:

one or more processors;

a storage device configured to store one or more programs, a server or a client in a service management system comprising: the server, a plurality of devices, and a plurality of clients establishing a communication connection with the plurality of devices;

the server is configured to receive a service execution request, determine a target client from the plurality of clients based on an identifier of a target client comprised in the service execution request, and forward the service execution request to the target client; and the target client is configured to parse service information comprised in the service execution request, determine a target device corresponding to the service information from the plurality of devices, generate a driving instruction for the target device by invoking a target device driving service of the target device, and drive the target device with the driving instruction to respond to the service information, wherein the target client is pre-configured with device driving services corresponding to the plurality of devices, wherein for a client in the plurality of clients, the client further comprises a service data management layer configured to:

obtain service data information; and distribute, based on information distribution policy, the service data information to a further client that has not received the service data information in a same network, so that the further client locally caches the service data information;

upload, to the server, a service cache state corresponding to the service data information after the local caching of the service data information is completed.

* * * * *